(12) United States Patent
Apte et al.

(10) Patent No.: US 12,216,614 B2
(45) Date of Patent: Feb. 4, 2025

(54) DATA RESTORE SYSTEM

(71) Applicant: Druva Inc., Santa Clara, CA (US)

(72) Inventors: Anand Apte, Pune (IN); Harshit Rai, Pune (IN)

(73) Assignee: Druva Inc., Santa Clare, CA (US)

( * ) Notice: Subject to any disclaimer, the term of this patent is extended or adjusted under 35 U.S.C. 154(b) by 26 days.

(21) Appl. No.: 18/096,065

(22) Filed: Jan. 12, 2023

(65) Prior Publication Data
US 2023/0222040 A1 Jul. 13, 2023

(30) Foreign Application Priority Data
Jan. 13, 2022 (IN) .............................. 202241002128

(51) Int. Cl.
| | | |
|---|---|---|
| G06F 11/00 | (2006.01) | |
| G06F 11/14 | (2006.01) | |
| G06F 16/11 | (2019.01) | |
| G06F 16/13 | (2019.01) | |
| G06F 16/16 | (2019.01) | |
| G06F 16/172 | (2019.01) | |
| G06F 16/174 | (2019.01) | |
| G06F 16/903 | (2019.01) | |

(52) U.S. Cl.
CPC ........ G06F 16/128 (2019.01); G06F 11/1435 (2013.01); G06F 11/1453 (2013.01); G06F 11/1466 (2013.01); G06F 11/1469 (2013.01); G06F 16/125 (2019.01); G06F 16/13 (2019.01); G06F 16/162 (2019.01); G06F 16/172 (2019.01); G06F 16/1744 (2019.01); G06F 16/1748 (2019.01); G06F 16/90335 (2019.01); *G06F 2201/84* (2013.01)

(58) Field of Classification Search
CPC ............. G06F 11/1435; G06F 11/1466; G06F 11/1469
See application file for complete search history.

(56) References Cited

U.S. PATENT DOCUMENTS

| | | | |
|---|---|---|---|
| 10,956,274 B2 * | 3/2021 | Attarde | G06F 3/067 |
| 2009/0271456 A1 * | 10/2009 | Kushwah | G06F 11/1451 |
| 2020/0097374 A1 * | 3/2020 | Cason | G06F 11/1469 |
| 2022/0283724 A1 * | 9/2022 | Malamut | G06F 3/0619 |
| 2023/0222040 A1 * | 7/2023 | Apte | G06F 16/172 |
| | | | 714/6.3 |

\* cited by examiner

*Primary Examiner* — Philip Guyton
(74) *Attorney, Agent, or Firm* — IceMiller LLP

(57) ABSTRACT

A data restore system is provided. The data restore system includes a backup data storage configured to store data for a client and a data restore module configured to receive a restore trigger from the client and to initiate restore operation for selected data from the backup data storage in response to the received trigger. The data restore module is further configured to receive information regarding the selected data to be restored and access a metadata store to receive metadata information for the selected data and provide the metadata information and the downloaded data blocks to a controller to facilitate sorting of the downloaded data blocks based on the files they belong to and store the downloaded restored data to a target data storage. The data restore module is further configured to interact with the checkpointing module to track the progress of restore operation in persistent storage and to minimize rework when restore operation is restarted from interrupt.

22 Claims, 5 Drawing Sheets

DATA RESTORE SYSTEM

CROSS REFERENCE TO RELATED APPLICATION

The present application claims priority under 35 U.S.C. § 119 to Indian patent application number 202241002128 filed Jan. 13, 2022, the entire contents of which are hereby incorporated herein by reference.

BACKGROUND

Embodiments of the present invention generally relate to restoration of data, and more particularly to a method and system for data restore from a backup storage.

Restoring a large data footprint from a backup storage can take several hours. It is important to keep the network pipes that carry data fully engaged for long durations and avoid network bottlenecks. There is a need to optimize recovery time objective (RTO) and maximize the usage of available resources such as central processing unit time and energy, memory and network bandwidth. For backup storages that use a combination of scale out index to store metadata and object stores to store data, this requires careful combination of fetching metadata and actual data blocks so as to keep the network pipe always engaged.

In addition, there is a need for an efficient data restore system that has a checkpointing mechanism to persistently track progress and avoid duplicate Input/Output on both source and destination storage locations when restore operation needs to resume from interrupt.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a data restore system is provided. The data restore system includes a backup data storage configured to store data for a client and a data restore module configured to receive a restore trigger from the client and to initiate restore operation for selected data from the backup data storage in response to the received trigger. In this setup, backup data storage consists of metadata store for storing metadata, and object store for storing data blocks. The data restore module is further configured to receive information regarding the selected data to be restored and access a metadata store to receive metadata information for the selected data. The data restore module is configured to access the metadata store to receive one or more urls to download data blocks for selected data based on their respective block identifications (BlockIDs) and to access an object store to concurrently download data blocks using the urls corresponding to the selected data. The data restore module is further configured to concurrently provide the metadata information and the downloaded data blocks to a controller to facilitate sorting of the downloaded data blocks based on the files they belong to and store the downloaded restored data to a target data storage.

In another embodiment, a data restore system is provided. The data restore system includes a memory storing one or more processor-executable routines and a processor communicatively coupled to the memory. The processor is configured to execute one or more processor-executable routines to receive a restore trigger to initiate restore operation for selected data from a backup data storage and access metadata information for the selected data. The processor is configured to concurrently receive urls for accessing data blocks for the selected data and use the urls to concurrently download data blocks corresponding to the selected data. The processor is configured to provide the metadata information and the downloaded data blocks to a controller to sort blocks based on files they belong to, store the downloaded restored data to a target data storage and track real-time progress of the restore operation from the backup data storage to the target data storage.

In another embodiment, a data restore method is provided. The method includes receiving a restore trigger to initiate restore operation for selected data from a backup data storage and accessing metadata information for the selected data. The method also includes concurrently receiving uniform resource locations (urls) for accessing data blocks for the selected data and concurrently downloading data blocks corresponding to the selected data. The method also includes concurrently providing the metadata information and the data blocks to a controller to sort the data blocks based on files they belong to, storing the downloaded restored data to a target data storage and tracking real-time progress of the restore operation from the backup data storage to the target data storage using the checkpointing module.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
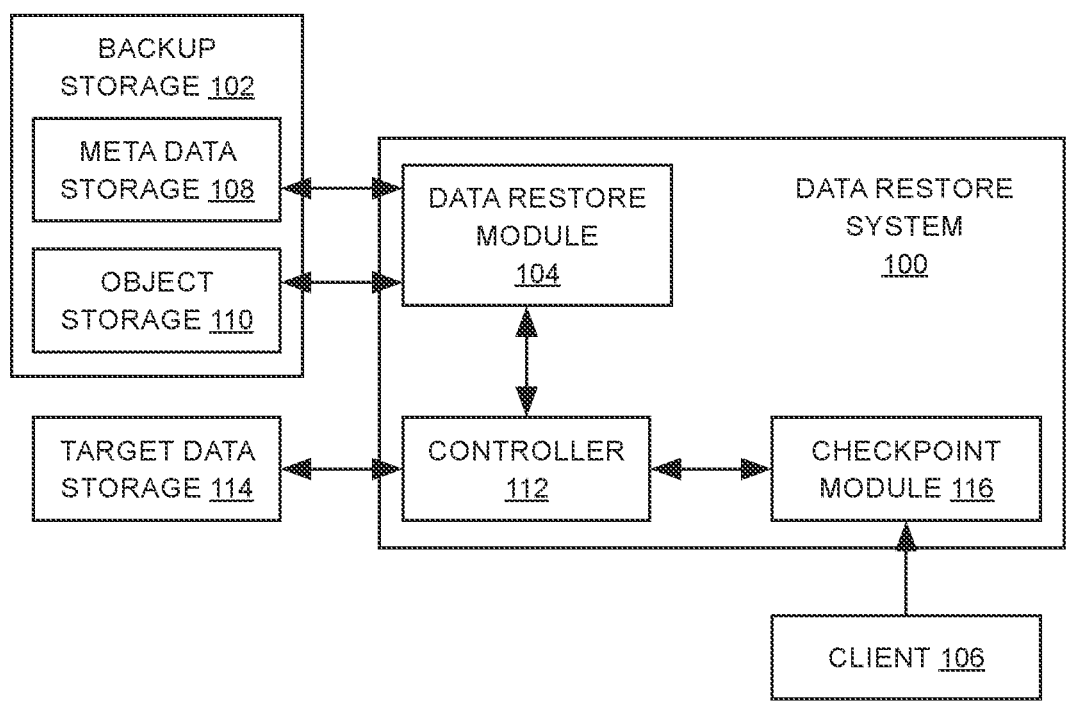
FIG. 1 is an example of a data restore system, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for storage architecture that is scalable, performant and cost effective compared to the current storage architectures.

FIG. 1 illustrates a block diagram of a data restore system 100, in communication with a controller 112 and a target data storage 114, according to embodiments of the present technique. In an embodiment, the data restore system 100 is configured to restore files, folders, emails, virtual machine images, databases, or combinations thereof. The data restore system 100 includes a data restore module 104, a controller 112 and a checkpoint module 116. The data restore system 100 is coupled to a backup storage 102 and a target data storage 114. The backup storage 102 includes a metadata storage 108, and an object storage 110. Each of these components is described in detail below.

The backup data storage 102 is usually a storage server that stores data for a client (e.g., client 106) of the data restore system 100. According to embodiments of the present description, the backup data storage 102 can include a cloud storage where data blocks are stored on a storage server, e.g., object-based store like AWS S3. Moreover, metadata is additional information maintained to allow restore of backed up data back into its original form. A database on the storage server referenced here as the metadata storage 108 is used to store the metadata. Non-limiting example of a metadata storage 108 includes a NoSQL database such as AWS DynamoDB, or Druva Daintree. Non-limiting examples of metadata stored in NoSQL DB include deduplication indexes, snapshots, usage counters, and the like.

The data restore module 104, is configured to receive a restore trigger from the client 106, to initiate a restore operation for selected data from the backup data storage 102 in response to the received trigger. The data restore module 104 is further configured to receive information regarding the selected data to be restored. Upon receiving the information, the data restore module 104, accesses the metadata storage 108, to retrieve metadata information for the selected data. Moreover, the data restore module 104 is configured to access the metadata storage 108 to receive one or more urls to download data blocks for selected data based on their respective block identifications (BlockIDs).

The metadata storage 108, is typically a database that stores metadata about the data for one or more clients. In an embodiment, the metadata information comprises at least one of file path, file properties, a list of offset and block identifiers (blockID) for one or more files of the selected data and the like. The metadata information for the selected data is received in response to one or more API calls, and wherein the API calls are repeated until the files and metadata block information is exhausted. In an embodiment, a sequence of file and block metadata information received from the metadata store is selected such that the sequence is aligned with an index structure used to store metadata on the metadata storage 108.

The urls for obtaining data blocks for the selected data are received in response to one or more API calls, made concurrently by the restore system to the metadata store. The data blocks for the selected data are received in response to concurrent API calls made to the object store, with blockID and URL information obtained from the prior API calls.

The data restore module 104, accesses the object storage 110 to concurrently download data blocks using the urls corresponding to the selected data. The data restore module 104, is further configured to concurrently provide the metadata information and the data blocks to the controller 112 to facilitate sorting of the downloaded data blocks based on the file they belong to. Typically, the controller 112 fetches the metadata information and data blocks for the selected data in response to one or more API calls, where the API calls are repeated until the files and metadata block information is exhausted.

The controller 112 includes one or more application programming interfaces (APIs) configured to allow the administrators to configure backup sets and define settings and/or policies. Further, the controller 112 includes one or more APIs configured to allow one or more agents to authorize and initiate a backup and/or restore session. The controller 112 further includes one or more APIs configured to allow the administrators to access the job status, storage statistics etc.

The downloaded data blocks are continuously stored onto the target data storage 114, as and when they are received. In an embodiment, the controller 112 is further configured to create one or more files on the target data storage 114 using the file path and file properties. The controller 112 is configured to receive downloaded data blocks along with the file offset and blockID for the one or more files, and sort data blocks based on the file path and store the sorted data blocks on the target data storage 114. The target data storage 114 is configured to support sparse file IO operations and the controller 112 is configured to use the sparse file IO operations to write the data blocks for a particular file to corresponding offset within the file, in the order in which the block download network IO operations are completed.

In an embodiment, the controller 112 is further configured to provide a block map entries of inflight and restored data blocks to a checkpoint module 116. The checkpoint module 116 is configured to determine if all the data blocks of the files of the selected data are restored. The controller 112, is configured to close the file and set corresponding file attributes of the one or more files if it is detected that all the data blocks for these files are restored.

In an embodiment, the checkpoint module 116, is configured to track real-time progress of the restore operation from the backup data storage 102 to the target data storage 114, and to facilitate restore in an event of restart of the data restore system 100. Typically, the checkpoint module 116 serializes an in-memory checkpoint state in a periodic manner as explained below.

In operation, the checkpoint module 116 is configured to get a copy of a page of metadata information, consisting of file path, properties, and block maps, when the page is fetched by the data restore system 100 as part of restore workflow. Further, the checkpoint module 116, is configured to prepare in-memory entries of Nextpage token for fetching the page along with files and blocks in-flight. The data restore module 104 fetches uniform resource locators (urls) for each blockID of the files, and concurrently downloads blocks from the object storage 110 using the downloaded urls. Upon downloading the blocks successfully, the data restore module 104 writes the downloaded blocks to the target data storage 114 and passes on the list of successfully downloaded blocks and files to checkpoint module 116.

Further, the checkpoint module 116 is configured to mark entries as done for blocks when restore operation comprising of downloading the block from backup data storage 102 and writing it to the target data storage 114 is complete. The checkpoint module 116 is configured to discard the state of the page once all the entries of the page, and the preceding pages are done and reflect the state of each of the files and blocks for selected data as they are downloaded and stored to the destination. The checkpoint module 116 is further configured to serialize an in-memory checkpoint state comprising of Nextpage token used to fetch the page and a list of block metadata entries for blocks successfully written to target storage in a periodic manner and store the checkpoint state.

Further, the checkpoint module 116 is configured to read the checkpoint state from persistent storage as the restore operation resumes from an interrupt from the checkpoint state, use the Nextpage token for the oldest incomplete page to fetch the list of metadata entries from the metadata store 108, for the obtained metadata entries, initiate download and write operations to target store for data blocks that were not previously downloaded as per the state available in the persistent checkpoint. A workflow describing the process of restoring data according to the present description is explained with reference to FIG. 2.

Figure 2:
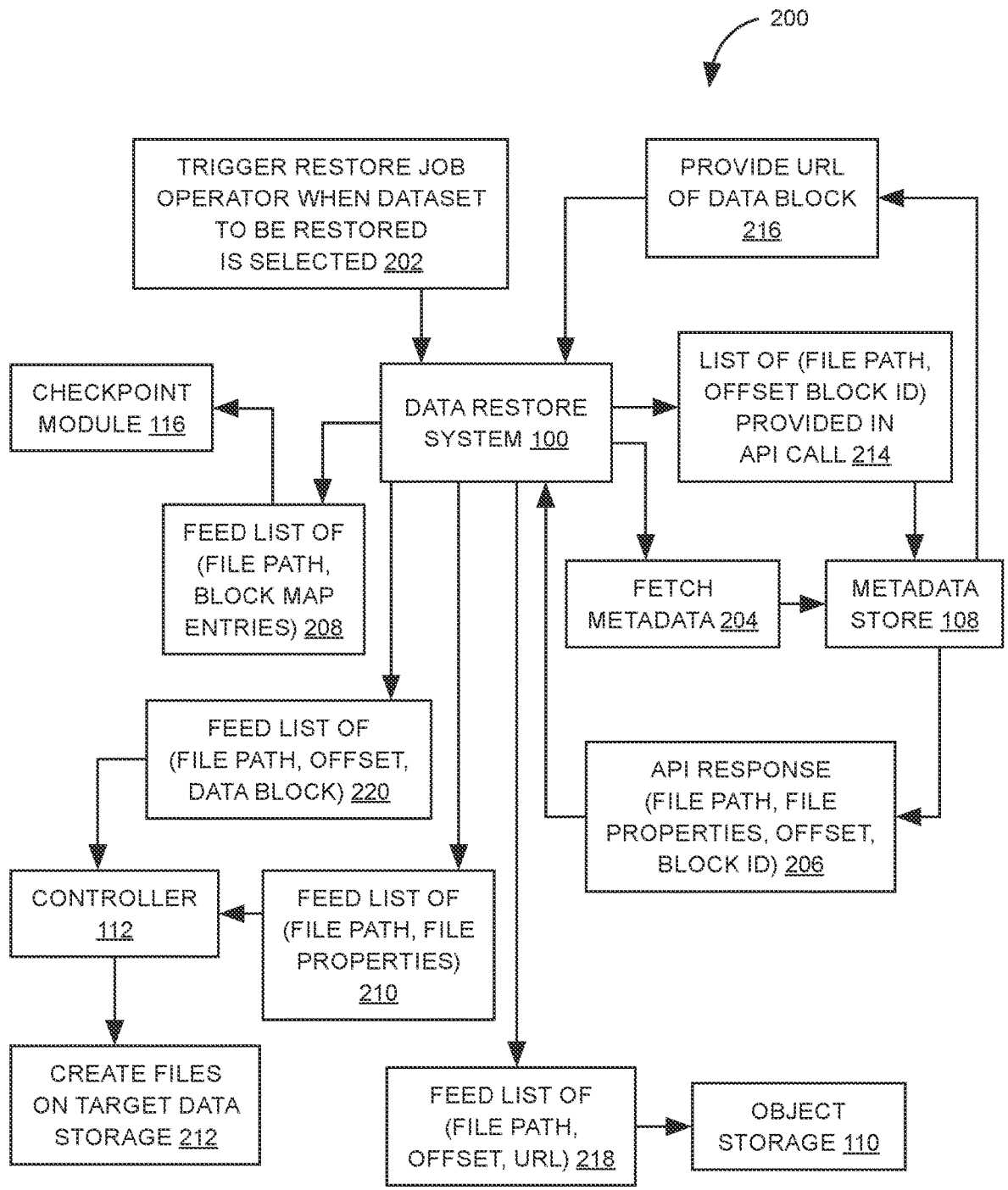
FIG. 2 is an example of a data restore workflow, according to some aspects of the present description.

FIG. 2 illustrates a workflow 200 for restoring data according to an embodiment of the present description. As shown at block 202, a restore job operation is triggered when a dataset to be restored is selected. Typically, a set of files and folders represent the dataset to be restored. The data restore system 100 receives the trigger.

At block 204, an API call is made to the metadata store 108, to fetch metadata for the dataset to be restored.

At block 206, an API response is provided that includes a file path, file properties (file size, timestamps and the like), and a list of (Offset, BlockID) tuples. As used herein, the term "BlockID" refers to a logical entity representing the block to be obtained to get data present in the file at a given Offset. This is a paginated API, where the API call gets repeated with a Nextpage token, till file and block metadata for selected dataset is exhausted.

At block 208, a list of file path and block map entries are fed to the checkpoint module 116 for tracking in-flight block download requests. At block 210, a list of (filepath, file properties) tuples are fed to the controller 112. At block 212, files are created on the target data storage 114.

At block 214, an API call is made to the metadata store 108. Typically, in the API call, a list of (filepath, offset, BlockID) tuples are fed to the metadata storage 108, in order to fetch a location or uniform resource locator (url) of the data block. This stage is concurrent and can handle multiple ongoing API calls, thereby maximizing the throughput.

At block 216, the url is provided to the data restore system 100. At block 218, a list of (filepath, Offset, url) tuples are used by data restore system 100 to make block download API calls to the object store 110. An example of the object store is AWS-S3. This stage is concurrent, and multiple block fetch API calls are in process at any given point in time. This ensures that the network pipe is fully utilized for downloading data blocks from the object storage 110. Typically, the data blocks are stored on the object storage 110, in a compressed form. Post download these data blocks, these may be decompressed to obtain original content.

At block 220, a list of (filepath, offset, data block) tuples are fed to the controller 112. At this point, demultiplexing occurs, where blocks are sorted based on the file path they belong to and fed to a 'Write' API on the target data storage 114. After the 'Write' is successful, the block map entry is fed to the checkpointing module 116 to mark this IO operation as 'done'. Based on the file size, the controller 112, identifies whether all data blocks for a file have been successfully restored. The controller 112, closes the file and sets file properties and attributes to complete the restore of a file.

In an example, following scheme is followed to achieve checkpointing for a multi-threaded restore operation:
1. APIs from metadata service 108 provide
    i. file listing and metadata for block downloads in repeatable order
    ii. Aggressive batching for this metadata with paginated results. The page tokens are persistent (i.e., not bound to a session)
2. Example output (single page) from metadata service:
    i. Path: folderexample, size: 0
    ii. Path: folderexample/fileexample, size: 3 MB
    iii. Blockmap: folderexample/fileexample, offset: 0, size: 1 MB, blockid: 0004
    iv. Blockmap: folderexample/fileexample, offset: 1 MB, size: 1 MB, blockid: 0010
    v. Blockmap: folderexample/fileexample, offset: 2 MB, size: 1 MB, blockid: 0003
    vi. NextPageToken: TokenABC
3. Module for Restore Checkpointing maintains state as follows
    i. Point in the stream, such that all previous items in stream have been successfully committed to destination
    ii. This is maintained as 'NextPage token' leading to the page in which, this checkpoint lies
    iii. List of 'committed' items in such a page
    iv. Beyond the data described in (a), based on the level of concurrency chosen for a job, the module maintains a list of 'committed' items in subsequent pages. This additional state avoids IO for these items, as the job restarts with the 'NextPage' token.

During restoration of data as described above, the present invention provides for a checkpointing process, the workflow of which is described with reference to FIG. 3.

Figure 3:
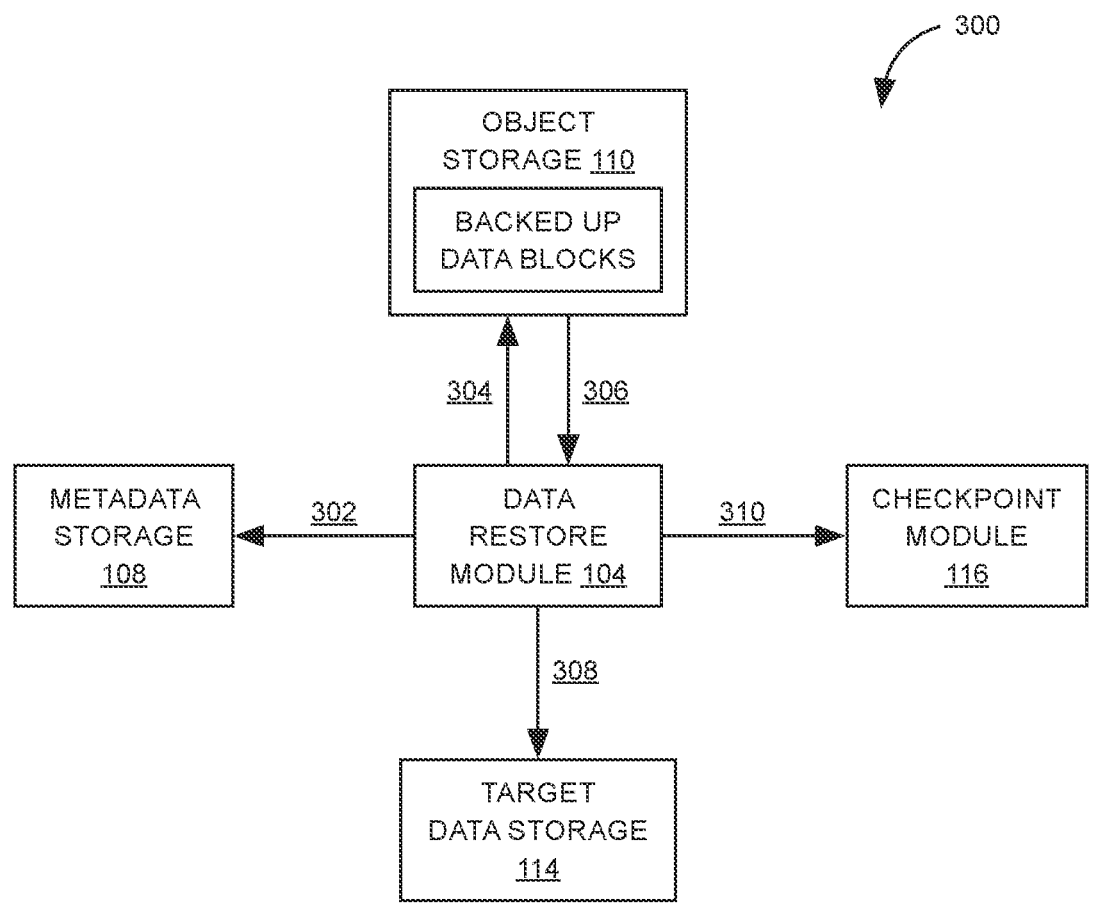
FIG. 3 is an example of a checkpointing workflow, according to some aspects of the present description.

FIG. 3 discloses a process environment 300 where checkpointing is performed by the checkpoint module 116 in communication with the data restore system 100 of FIG. 1. At block 302, a page of a file or folder and block map information is fetched, as described above. The steps for the checkpointing process are described below:
4. Make in-memory entries of Nextpage token used to fetch a page of metadata entries, as well as files and blocks to be in-flight, with the checkpoint module 116;
5. Data Restore system 100 makes concurrent API calls to get download urls for each block id obtained in a Fetch API.

At block 304, concurrent API calls are made by data restore system 100 to download backedup data blocks from the object Storage 110 (e.g., S3). This uses download urls as described.

At block 306, as blocks get downloaded, they are written to the destination storage/filesystem such as the target data storage 114. It may be noted that most of the destination storage/file systems support sparse files. The present technique leverages it and can checkpoint sparse ranges.

At block 308, as blocks get committed to the destination storage, the information is passed over to checkpoint module 116 (block 310). The checkpoint module 116, marks the corresponding entry for a file block in the page as 'Done'.

Once all entries for a page are 'Done', and this applies to all the previous pages, the module can discard the state for this page.

At block 310, the in-memory checkpoint state is periodically (e.g., every couple of minutes) serialized, and committed to persistent storage. This serves as the persistent checkpoint. The frequency is a trade-off between checkpoint IO overhead, and data loss in the event of restart. A time period of about 2 min is a good value as (a) One IO to checkpoint storage every 2 min is minimal IO overhead (b) rework needed in case of restart is ~2 min of IO activity which is sufficiently small.

As all the files and blocks for a restore operation get downloaded and get committed to the destination, the checkpoint module 116 reflects this state i.e., all the entries it holds reflect the state of committed entries and may be discarded.

The present technique may be used for a variety of restore-like workloads e.g., bulk export, EDiscovery data download and so forth. A method of data restore is illustrated in FIG. 4.

Figure 4:
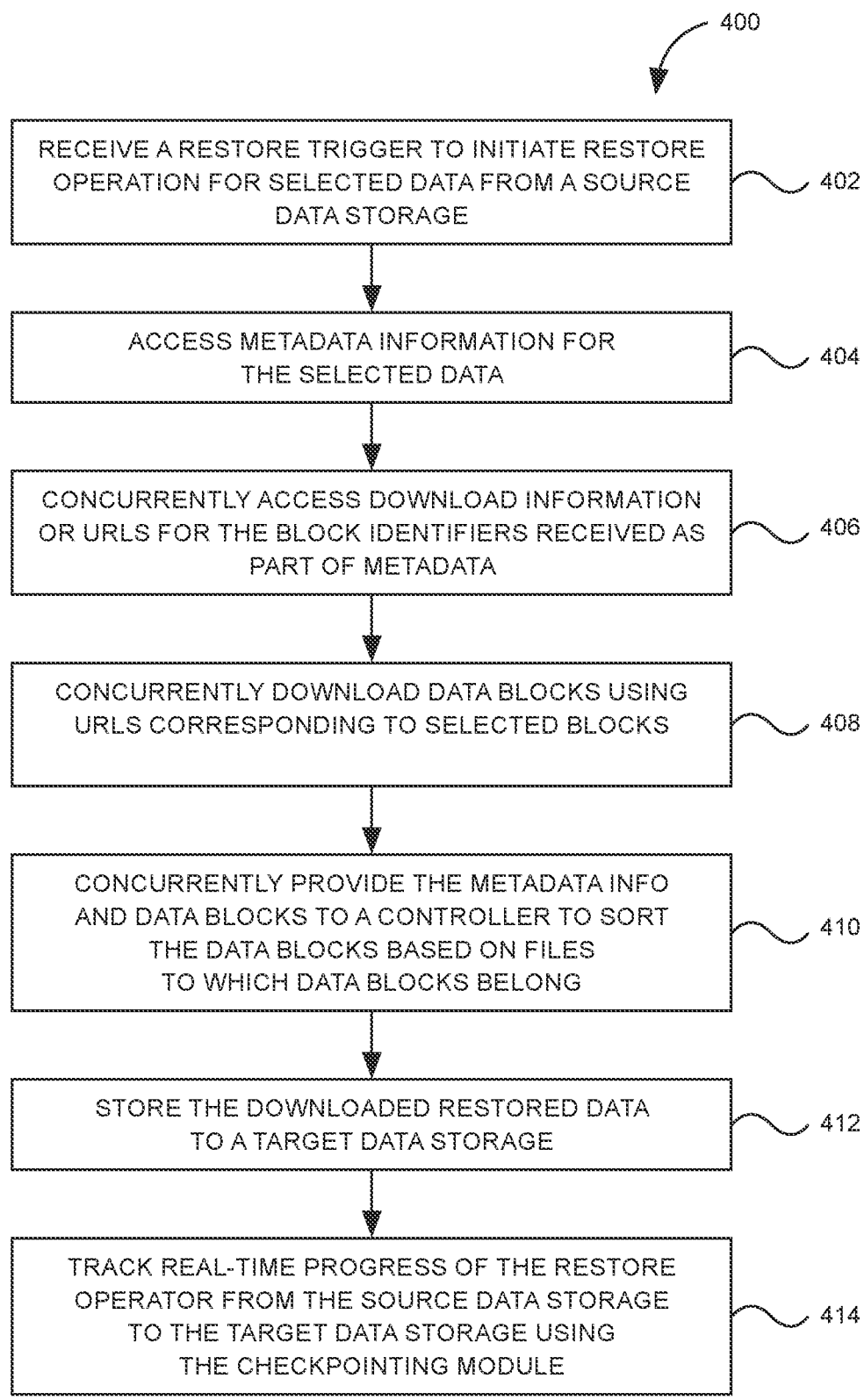
FIG. 4 is a flowchart depicting a method for data restore, according to some aspects of the present description.

FIG. 4 illustrates an example method of data restore using the data restore system 100 of FIG. 1

At block 402, a restore trigger is received to initiate restore operation for selected data from a backup storage.

At block 404, metadata information is accessed for the selected data.

At block 406, download information or urls are concurrently accessed for the block identifiers received as part of metadata At block 408, data blocks are concurrently downloaded using urls corresponding to the selected data.

At block 410, metadata information and the data blocks are concurrently provided to a controller to sort the data blocks based on the files to which the data blocks belong.

At block 412, the downloaded restored data is stored to a target data storage. One or more files are created on the target data storage using a file path and file properties of the selected data. The data blocks are fetched using an offset and a blockID and url for the one or more files. The data blocks are further sorted based on the file path and stored on the target data storage.

At block 414, real-time progress of the restore operation is tracked from the backup storage to the target data storage using a checkpoint module. Further, all the backed up data blocks of the files of the selected data are restored using block map entities of backed up data blocks.

The disclosed checkpoint mechanism can handle concurrency efficiently. In some examples, latency observed for fetching data blocks from WAN-hosted object stores (e.g., 110) is in the range of 100 to 1000 ms. In an example, to achieve a desired throughput, one needs to have multiple object download requests (100-1000) running concurrently and they typically finish out of order. The checkpointing method being described here tracks the state of in-flight and downloaded blocks in such a concurrent ecosystem.

Further, the checkpointing process minimizes rework. It helps in avoiding repeating the input output process at the backup storage and destination storage locations, whenever a restore job is restarted. Further, disclosed checkpoint has a minimized state i.e., it is usually proportional to the number of in-flight IO requests. In addition, the checkpointing is by itself lightweight and does not introduce bottlenecks and leads to minimal input output overhead.

Figure 5:
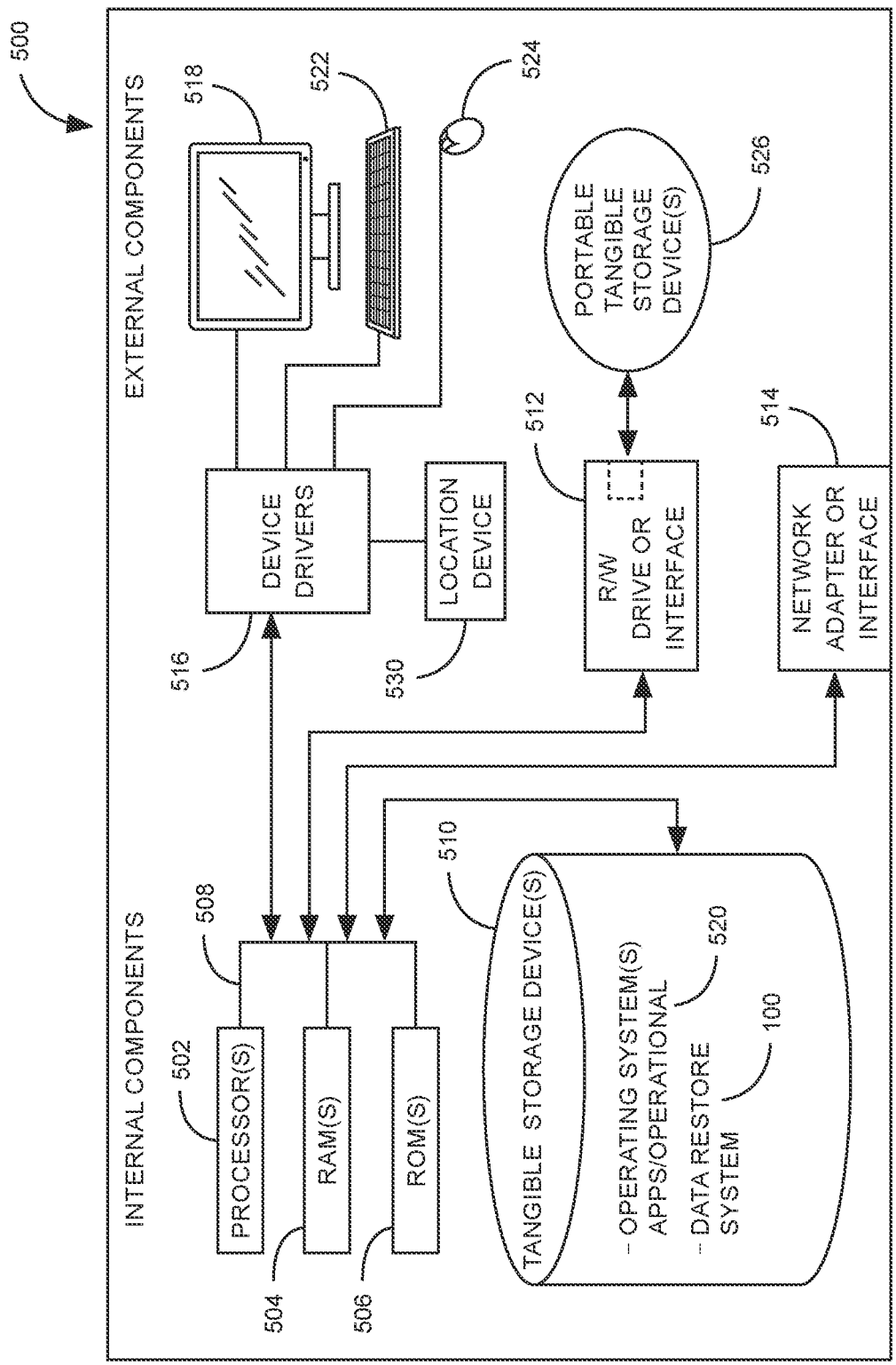
FIG. 5 is a block diagram of an embodiment of a computing device in which the modules of the data restore system, described herein, are implemented.

FIG. 5 is another example illustration (500) of the data restore system (100) comprising a memory (504) storing one or more processor-executable routines, and a processor (502) communicatively coupled to the memory (504), where the processor (502) is configured to execute the one or more processor-executable routines. Based on the proposed methods, the processor is configured to receive a restore trigger to initiate restore operation for selected data from a backup data storage; access metadata information for the selected data; concurrently receive urls for accessing data blocks for the selected data; use the urls to concurrently download data blocks corresponding to the selected data; provide the metadata information and the downloaded data blocks to a controller to sort blocks based on files they belong to; store the downloaded restored data to a target data storage; and track real-time progress of the restore operation from the backup data storage to the target data storage.

The processor (502) is configured to execute the one or more processor-executable routines to facilitate real-time restore operation from the backup data storage to the target data storage in an event of restart of the system. The processor (502) is further configured to execute the one or more processor-executable routines to fetch the metadata information and data blocks for the selected data in response to one or more API calls, and wherein the API calls are repeated until the files and metadata block information is exhausted. The processor (502) is configured to fetch a page of file path information, file properties and block map information corresponding to files being restored; prepare in-memory entries of a Nextpage token used to fetch the page along with files and blocks to be in-flight; concurrently fetch download uniform resource locators (urls) for each blockID of the file data blocks; concurrently download blocks from the object storage using the downloaded urls; and write the downloaded blocks to the target data storage.

The processor (502) is further configured to execute the one or more processor-executable routines to mark entries for each of the downloaded blocks of the page to the target data storage as done in the checkpoint module; discard the state for this page once all the entries for the page and the previous pages are done; and reflect the state of each of the files and blocks for selected data as they are downloaded and stored to destination. The processor (502) is further configured to execute the one or more processor-executable routines to display a restore status of a checkpoint state of the restore operation and details of the restored data at any desired checkpoint.

The modules of the data restore system (100) described herein are implemented in computing devices. One example of a computing device (500) is described below in FIG. 5. The computing device includes one or more processor (502), one or more computer-readable RAMs (504) and one or more computer-readable ROMs (506) on one or more buses (508). Further, computing device (500) includes a tangible storage device (510) that may be used to execute operating systems (520) and the online platform system (100). The various modules of the data restore system (100) may be stored in tangible storage device (510). Both, the operating system (520) and the system (100) are executed by processor (502) via one or more respective RAMs (504) (which typically include cache memory). The execution of the operating system (520) and/or the system (100) by the processor (502), configures the processor (502) as a special purpose processor configured to carry out the functionalities of the operation system (520) and/or the online platform system (100) as described above.

Examples of storage devices (510) include semiconductor storage devices such as ROM, EPROM, flash memory or any other computer-readable tangible storage device that may store a computer program and digital information.

Computing device also includes a R/W drive or interface (514) to read from and write to one or more portable computer-readable tangible storage devices (528) such as a CD-ROM, DVD, memory stick or semiconductor storage device. Further, network adapters or interfaces (512) such as a TCP/IP adapter cards, wireless Wi-Fi interface cards, or 3G or 4G wireless interface cards or other wired or wireless communication links are also included in computing device.

In one example embodiment, the online platform system (100) may be stored in tangible storage device (510) and may be downloaded from an external computer via a network (for example, the Internet, a local area network or other, wide area network) and network adapter or interface (512).

Computing device further includes device drivers (516) to interface with input and output devices. The input and output devices may include a computer display monitor (518), a keyboard (524), a keypad, a touch screen, a computer mouse (526), and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device's main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

What is claimed is:

1. A data restore system, comprising:
a backup data storage configured to store data for a client;
a data restore module configured to receive a restore trigger from the client and to initiate restore operation for selected data from the backup data storage in response to the received trigger, wherein the data restore module is further configured to:
receive information regarding the selected data to be restored;
access a metadata storage to receive metadata information for the selected data;
access the metadata storage to receive one or more urls to download data blocks for selected data based on their respective block identifications (BlockIDs);
access an object storage to concurrently download data blocks using the urls corresponding to the selected data;
concurrently provide the metadata information and the downloaded data blocks to a controller to facilitate sorting of the downloaded data blocks based on the files they belong to; and
store the downloaded restored data to a target data storage,
wherein the urls for obtaining data blocks for the selected data are received in response to one or more API calls, made concurrently by the restore system to the metadata storage, and
wherein the controller is further configured to close the file and set corresponding file attributes of the one or more files if it is detected that all the data blocks for a particular file are restored.

2. The data restore system of claim 1, wherein the data restore system is configured to restore files, folders, emails, virtual machine images, databases, or combinations thereof.

3. The data restore system of claim 1, wherein the metadata information comprises at least one of file path, file properties, a list of offset and block identification (BlockID) for one or more files of the selected data.

4. The data restore system of claim 1, wherein the metadata information for the selected data is received in response to one or more API calls, and wherein the API calls are repeated until the files and metadata block information is exhausted.

5. The data restore system for claim 1, wherein a sequence of file and block metadata information received from the metadata storage is selected such that the sequence is aligned with an index structure used to store metadata at the metadata storage.

6. The data restore system for claim 1, wherein the data blocks for the selected data are received in response to concurrent API calls made to the object storage, with blockID and url information obtained from the prior API calls.

7. The data restore system of claim 1, wherein the controller is further configured to:
create one or more files on the target data storage using the file path and file properties;
receive downloaded data blocks along with file offset and blockID for the one or more files; and
sort data blocks based on the file path and store the sorted data blocks on the target data storage.

8. The data restore system of claim 1, wherein the target data storage is configured to support sparse file IO operations and the controller is configured to use the sparse file IO operations to write the data blocks for a particular file in the order in which the block download network IO operations are completed.

9. The data restore system of claim 1, wherein the controller is further configured to provide block map entries of inflight and restored data blocks to a checkpoint module, wherein the checkpoint module is configured to determine if all the data blocks of the files of the selected data are restored.

10. The data restore system of claim 1, wherein the checkpoint module is configured to track real-time progress of the restore operation from the backup data storage to the target data storage and to facilitate restore in an event of restart of the system, wherein the checkpoint module is configured to:
get a copy of a page of file path information, file properties and block map information corresponding to files being restored, when the page is fetched by the data restore system from metadata storage;
prepare in-memory entries of a Nextpage token used to fetch the page along with files and blocks to be in-flight.

11. The data restore system of claim 10, wherein the checkpoint module is further configured to:
mark entries as done for blocks when restore operation comprising of downloading the block from object storage and writing it to the target store is complete;
discard the state for this page once all the entries for blocks in the page and the previous pages are done; and
reflect the state of each of the files and blocks for selected data as they are downloaded and stored to destination.

12. The data restore system of claim 11, wherein the checkpoint module is further configured to serialise an in-memory checkpoint state comprising of Nextpage token used to fetch the page and a list of block metadata entries for blocks successfully written to target storage in a periodic manner and store the checkpoint state.

13. The data restore system of claim 12, wherein the checkpoint module is further configured to:
  read the checkpoint state from persistent storage as the restore operation resumes from an interrupt from the checkpoint state;
  use the Nextpage token for the oldest incomplete page to fetch the list of metadata entries from metadata storage;
  for the obtained metadata entries, manage download and write operation to target store for data blocks that were not previously downloaded as per the entries available in the checkpoint state.

14. A data restore system, comprising:
  a memory storing one or more processor-executable routines; and
  a processor communicatively coupled to the memory, the processor configured to execute the one or more processor-executable routines to:
    receive a restore trigger to initiate restore operation for selected data from a backup data storage;
    access metadata information for the selected data;
    concurrently receive urls for accessing data blocks for the selected data;
    use the urls to concurrently download data blocks corresponding to the selected data;
    provide the metadata information and the downloaded data blocks to a controller to sort blocks based on files they belong to;
    store the downloaded restored data to a target data storage;
    track real-time progress of the restore operation from the backup storage to the target data storage;
    fetch a page of file path information, file properties, and block map information corresponding to files being restored;
    prepare in-memory entries of a Nextpage token used to fetch the page along with files and blocks to be in-flight;
    concurrently fetch download uniform resource locators (urls) for each blockID of the file data blocks;
    concurrently download blocks from the object storage using the downloaded urls; and
    write the downloaded blocks to the target data storage.

15. The data restore system of claim 14, wherein the processor is configured to execute the one or more processor-executable routines to facilitate real-time restore operation from the backup storage to the target data storage in an event of restart of the system.

16. The data restore system of claim 14, wherein the processor is further configured to execute the one or more processor-executable routines to fetch the metadata information and data blocks for the selected data in response to one or more API calls, and wherein the API calls are repeated until the files and metadata block information is exhausted.

17. The data restore system of claim 14, wherein the processor is further configured to execute the one or more processor-executable routines to:
  mark entries for each of the downloaded blocks of the page to the target data storage as done in the checkpoint module;
  discard the state for this page once all the entries for the page and the previous pages are done; and
  reflect the state of each of the files and blocks for selected data as they are downloaded and stored to destination.

18. The data restore system of claim 14, wherein the processor is further configured to execute the one or more processor-executable routines to display a restore status of a checkpoint state of the restore operation and details of the restored data at any desired point in time.

19. A data restore method, comprising:
  receiving a restore trigger to initiate restore operation for selected data from a backup data storage;
  accessing metadata information for the selected data;
  concurrently receive uniform resource locations (urls) for accessing data blocks for the selected data;
  concurrently downloading data blocks corresponding to the selected data;
  concurrently providing the metadata information and the data blocks to a controller to sort the data blocks based on files they belong to;
  storing the downloaded restored data to a target data storage;
  tracking real-time progress of the restore operation from the backup data storage to the target data storage using a checkpointing module;
  fetch a page of file path information, file properties, and block map information corresponding to files being restored;
  prepare in-memory entries of a Nextpage token used to fetch the page along with files and blocks to be in-flight;
  concurrently fetch download uniform resource locators (urls) for each blockID of the file data blocks;
  concurrently download blocks from the object storage using the downloaded urls; and
  write the downloaded blocks to the target data storage.

20. The method of claim 19, wherein the method comprises restarting the restore operation in a restart event of the system.

21. The method of claim 19, wherein the method further comprises
  creating one or more files on the target data storage using a file path and file properties of the selected data;
  fetching data blocks using an offset and a blockID for the one or more files; and
  sorting data blocks based on the file path and store the sorted data blocks on the target data storage.

22. The method of claim 21, further comprising determining if all the data blocks of the files of the selected data are restored using block map entries of restored data blocks.

* * * * *